April 18, 1967
S. DEINESS
3,314,773
LOW TEMPERATURE SYSTEM
Filed Nov. 30, 1965
3 Sheets-Sheet 1
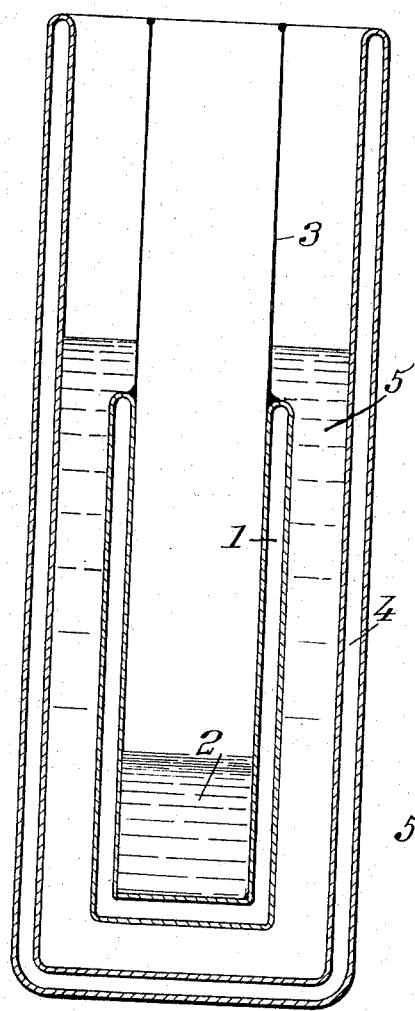
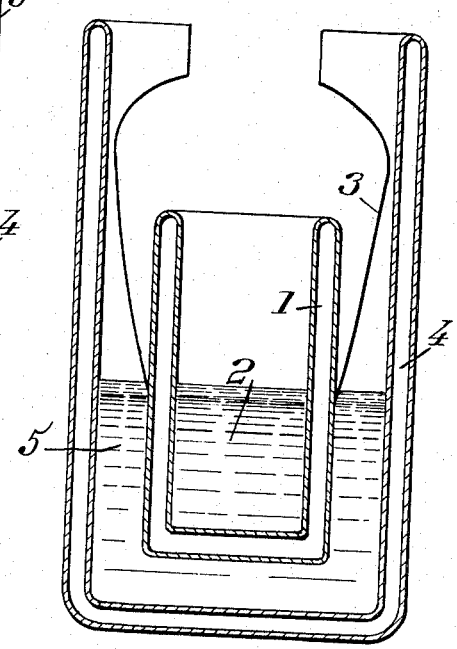
INVENTOR.
SERGE DEINESS
BY
AGENT April 18, 1967  S. DEINESS  3,314,773
LOW TEMPERATURE SYSTEM
Filed Nov. 30, 1965

INVENTOR.
SERGE DEINESS
BY
Frank R. Trifari
AGENT

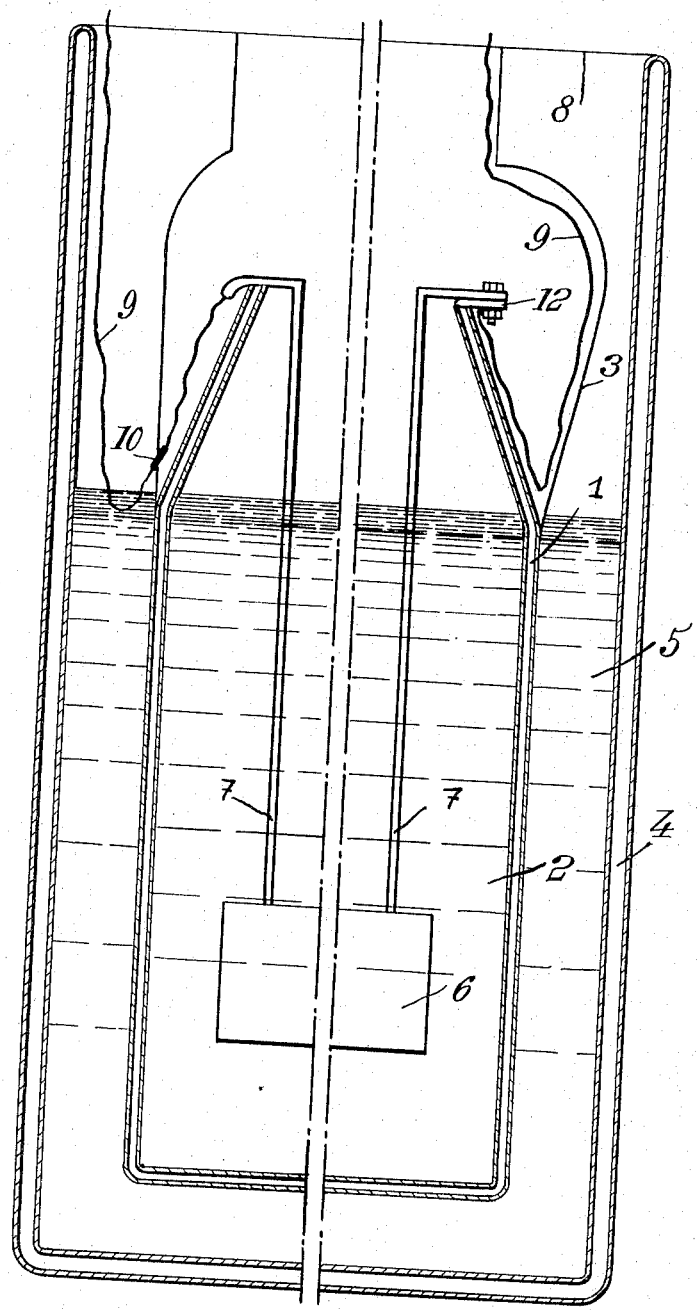

3,314,773
LOW TEMPERATURE SYSTEM
Serge Deiness, Versailles, France, assignor to North American Philips Company, Inc., New York, N.Y., a corporation of Delaware
Filed Nov. 30, 1965, Ser. No. 510,490
Claims priority, application France, Dec. 11, 1964, 998,366
6 Claims. (Cl. 62—45)

The invention relates to a low temperature system which is suitable for maintaining liquids and/or articles at a low temperature, the said system comprising at least one double-walled thermally insulated container, preferably a container with double walls, the space between them being evacuated, the double wall being provided with a sheath-like element which projects above the upper edge of the container. Known low temperature systems of this type are used to maintain, for example, electronic circuits at a very low temperature.

In order to insulate a medium with a very low temperature efficiently from the ambient temperature, in general several Dewar flasks are used placed one in the other. Dewar flasks are containers with double reflecting walls the space between them being evacuated. In a first container an intermediate temperature of, for example, 77° K. is produced by means of a comparatively inexpensive liquid of low temperature, for example, liquid nitrogen. A second container of the same type is placed in the said liquid which second container contains liquid hydrogen (20° K.) or liquid helium (4.2° K.). In this latter container the apparatus is immersed which must be maintained at a very low temperature.

In the most commonly used constructions a single-walled sheath-like element is arranged on the inner container. This element is cooled by the liquid in the first container the level of which lies just above the point of connection of the said element to the double-walled second container. When the outer part of the double wall of the second container is manufactured from a readily heat-conducting material or is lined with such a material, the liquid in the second container need not be in contact with the sheath-like element. Naturally, the inner part of the double wall of the second container may not be heat-conducting. As a result of its own heat-conductivity the latter would supply heat to the cold liquid in the second container, which liquid is more expensive than the liquid in the first container. When the sheath-like elements are not provided, heat from the ambient atmosphere above the container immediately is supplied to the cold liquid. The single-walled element does not avoid the said supply of heat entirely, but the heat can only be supplied from a region with much lower temperature because the element is cooled as a result of which its heat transmission is considerably reduced. To avoid too great a loss of helium, the surface of the latter in practice is at a minimum distance of approximately 40 cm. from the upper edge of the sheath-like element, which has the following practical drawbacks: The large vertical dimension makes it necessary to place the system on the floor which makes the observation very difficult when a window or observation strip has been provided in the side wall of the system; the observation from the top through a transparent cover is difficult; the heat capacity of the long mounting supports and of the long current conductors is large. It is difficult to realize a sufficiently rigid assembly, to maintain centering, and to provide a probe at the correct point.

The low temperature system according to the invention overcomes the aforesaid drawbacks and for that purpose is characterized in that the said sheath-like element is secured to the outer wall of the said container at some distance from the edge of the latter.

In order that the invention may readily be carried into effect, a few embodiments thereof will now be described in greater detail, by way of example, with reference to the diagrammatic drawings, which are not drawn to scale.

FIG. 1 is a cross-sectional view of a known low temperature system.

FIGURES 2, 3 and 4 are cross-sectional views of the low temperature system according to the invention.

FIG. 5 shows two half cross-sectional views of a container according to the invention.

Figure 4:
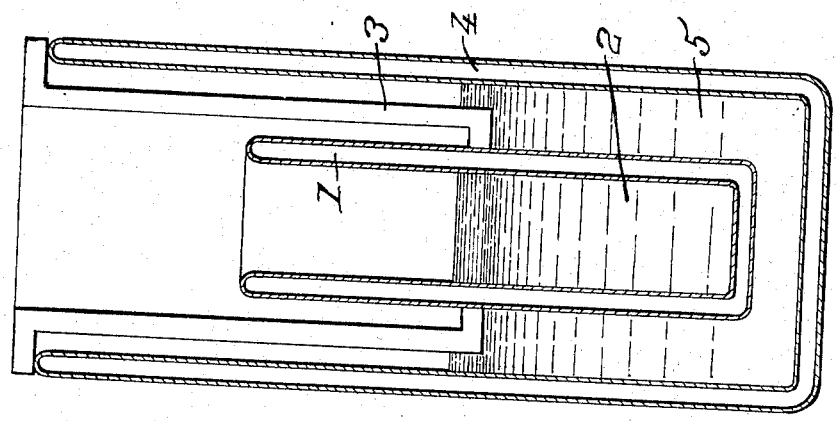

In FIG. 1 a sheath-like element 3 is provided on the inner container 1 which contains helium 2. The said container 1 is placed in a double-walled container 4 with liquid nitrogen 5 therein.

FIG. 2 shows a low temperature system which, as regards the heat loss, is similar to the system shown in FIG. 1. In this case the sheath-like element 3 has a special shape and the point of connection lies at approximately 10 cm. from the edge of the said container. The intermediate space between the element 3 and the upper part of the container 1 is such that the convection between the two is negligible. As shown in the figure the height of this system is much smaller than that of the known system.

Figure 3:
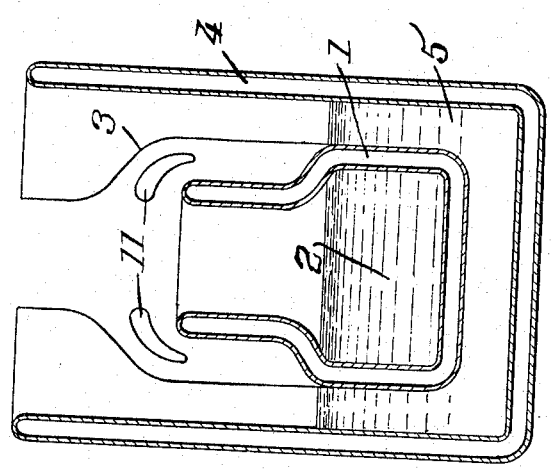

FIG. 3 shows a low temperature system with the same vertical dimensions as that of FIG. 2. In this embodiment the container 1 has a greater capacity than the container 1 shown in FIG. 2 as a result of its curved shape. The point of connection of the container 1 and of the sheath-like element 3, which is likewise curved in order that the convection between the element 3 and the upper part of the container 1 be negligible, lies at substantially the same distance from the upper edge of the container 1 as in the embodiment shown in FIG. 2.

In addition this figure shows the possibility of providing radiation screens 11 between the upper edge of the container and the element 3, which screens may comprise double walls.

FIG. 4 shows a simple embodiment of a low temperature system; in this embodiment the element 3 is manufactured from foamed polystyrene, a material which can very readily be moulded.

FIG. 5 shows an example with a container, in which a super-conducting coil 6 is arranged. This embodiment shows an additional advantage of the low temperature system according to the invention: The special shape of the inner container 1 makes it possible to secure the supports 7 to the upper edge of the container which supports may serve as current conductors for the superconducting coil 6. These supports 7 may be secured to the container 1 by means of a shoulder as shown in the left-hand part of the drawing, or, when the container 1 is manufactured from metal, by means of bolts to the metal component 12 which is soldered to the container 1 and with which it forms an assembly, as shown in the right-hand part of the figure. This way of mounting makes a yoke 8, which bears on the edge of the container 4 and which usually hampers the accessibility, superfluous and makes it possible by a partial dismantling to arrange a superconducting coil or other component to be stored at low temperatures in its place. Because the upper edge of the container 1 is at a small distance from the upper edge 8, the supplies are easily accessible.

The current conductors leave the container with helium ether through a lead-out sleeve 10 which may be arranged near the connection point of element 3 and the container 1, in a manner such that the said conductors are immersed through a given length in the liquid nitrogen 5 as shown in the left-hand part of the figure, or along the container 1 and the element 3, as shown in the right-hand part of the figure.

Since, in the first case, the point of the current supply wires which is in the liquid nitrogen has a temperature of 77° K., less thermal energy will flow through the said wires to the helium than in the known system in which the current conductors have a temperature of 300° K. at their one end.

By choosing, for example, a container of the known type, in which the length of the element 3 and the distance between the upper edge of the container 1 and the surface of the helium 2 are 20 cm., and a container according to the invention, in which the distance between the surface of the helium 2 and the upper edge of the container 1 is 10 cm., as is the distance between the said edge of the container 1 and the upper edge of the element 3, the following table is obtained.

| Known container | | Container according to the invention | | |
|---|---|---|---|---|
| P, cm. | C, cm. | P' (same P), cm. | C' (same P), cm. | Gain C'/C (same P), cm. |
| 45 | 5 | 25 | 25 | x 5 |
| 50 | 10 | 30 | 30 | 3 |
| 60 | 20 | 40 | 40 | 2 |
| 70 | 30 | 50 | 50 | 1,66 |
| 80 | 40 | 60 | 60 | 1,5 |
| 90 | 50 | 70 | 70 | 1,4 |
| 100 | 60 | 80 | 80 | 1,33 |

P is the total height of the known system.
C is the height of the helium in a system of the known type with height P.
P' is the total height of a low temperature system according to the invention with the same thermal losses as a system of the known type with height P.
C' is the height of the helium in a system according to the invention with height P'.

This table shows in particular that for the same height of the system the gain in capacity, with equal diameters, for a very high system is at least 33% and that the capacity for an average height (60 cm.) is doubled. It may even be considered to use a very small height of, for example, 45 cm. (5-fold capacity in my embodiment) and even less, since the penetration of heat to the helium yet remains within permissable limits.

It may be useful, in particular when only one double-walled vessel is used, to contact the sheath-like element to the container 3 in the proximity of the bottom of the latter. In this case it should be ensured that the heat insulation between the upper edge of the container and the element is such that the convection is negligible.

Satisfactory results were obtained with a low temperature system according to the invention in which, contrary to the normal system, the level of the helium was higher than that of the liquid nitrogen.

What is claimed is:

1. A device for maintaining an object at a low temperature comprising at least one double-walled, thermally insulated container in which the space between said walls is at sub-atmospheric pressure, an inner container spaced from said double-walled container, a cooling medium in each of said containers, and a sheath-like element connected to the outer wall of said inner container at a predetermined distance from the top edge thereof, said sheath-like element projecting above said top edge of said inner container.

2. A device for maintaining an object at a low temperature as claimed in claim 1 further comprising supports for said object to be cooled which bear on the top edge of said inner container.

3. A device for maintaining an object at a low temperature as claimed in claim 1 further comprising a plurality of current conductors which pass through said sheath-like element at least at one point.

4. A device for maintaining an object at a low temperature as claimed in claim 3 wherein said conductors are passed through said sheath-like elements adjacent to the connection of the latter to the other side wall of said inner container.

5. A device for maintaining an object at a low temperature as claimed in claim 3 wherein said double-walled container contains a cold liquid, and said current conductors are in contact with said cold liquid before they are passed through said sheath-like elements.

6. A device for maintaining an object at a low temperature as claimed in claim 1 further comprising a plurality of radiation screens located between the top edge of said inner container and said sheath-like elements.

References Cited by the Examiner
UNITED STATES PATENTS

| 2,892,250 | 6/1959 | Bartels | 62—514 |
| 2,967,961 | 1/1961 | Heil | 62—514 |
| 3,119,238 | 1/1964 | Chamberlain et al. | 62—45 |
| 3,176,473 | 4/1965 | Andonian | 62—45 |

LLOYD L. KING, *Primary Examiner.*